3,732,238
CARBAMOYLBENZOTRIAZOLE ANTHELMINTICS
Maurice William Baker, Clifton, Jennifer Crowley, Newark, Thomas Iswel Watkins, West Bridgford, and Nigel George Clark, St. Albans, England, assignors to Boots Pure Drug Company, Nottingham, England
No Drawing. Filed July 14, 1971, Ser. No. 162,622
Claims priority, application Great Britain, Aug. 5, 1970, 37,878/70
Int. Cl. C07d 55/04
U.S. Cl. 260—308 B          5 Claims

ABSTRACT OF THE DISCLOSURE

N-dialkylcarbamoylbenzotriazoles are prepared by reacting the appropriate carbamoyl chloride with benzotriazole in the presence of a tertiary amine. The compounds have activity as anthelmintic agents. An example of the invention is (N - methyl-N-n-heptylcarbamoyl)benzotriazole as a mixture or as its 1 or 2 isomer.

---

This invention relates to new chemical compounds with anthelmintic activity, anthelmintic compositions containing the new compounds as active ingredients and the use of the new compounds for the control of helminthiasis.

According to one aspect of the invention there are provided new compounds which may be represented by the general formula

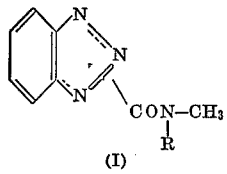

(I)

in which R is an alkyl radical containing more than 4 carbon atoms. If the carbamoyl N-substituent is at 1, the triazole double bond is at 2, 3; at 2 it is at 1, 8. The radical R may have a branched chain, but preferably has a straight chain. The radical R may contain not more than 18 carbon atoms, for example preferably not more than 5-12 carbon atoms. Advantageous compounds of the invention are those in which R is an alkyl radical containing 5-9 carbon atoms. Thus advantageous values of R are n-pentyl, n-hexyl, n-heptyl, n-octyl and n-nonyl.

We have found that the compounds of the invention possess valuable anthelmintic activity and are accordingly useful for the control of helminthiasis in animals, for example domestic animals such as sheep, cattle, pigs and dogs. For example, the compounds are highly active against Haemonchus spp. such as *Haemonchus contortus*, Ostertagia spp. such as *Ostertagia circumcincta* and Trichostrongylus spp. such as *Trichostrongylus colubriformis*. Surprisingly, the compounds of the invention possess a superior anthelmintic activity and/or lower mammalian toxicity than many closely related N-carbamoylbenzotriazole derivatives.

The compounds of the invention are conveniently administered in the form of anthelmintic compositions. Such compositions, which constitute a further feature of the invention, comprise as an active ingredient a compound of the invention together with, for example in admixture with, a non-toxic carrier. The non-toxic carrier may be any of the carriers which are known in the art for the formulation of anthelmintic compounds and include, for example, diluents, fillers, binders, absorbents, lubricants, suspending agents, dispersing agents, thickening agents and surface active agents.

The compositions of the invention may be liquids or solids and may be prepared in unit dosage form. The compositions may take the form of tablets, capsules, pills, boluses, drenches, powders or liquids for mixing wtih food or water, animal feed compositions, injectable preparations, or other forms known in the art as suitable for the administration of anthelmintic compounds. In the case of compositions for oral administration, the carrier used must of course be orally ingestible.

Typical compositions of the invention may be prepared in the following manner.

Tablets may be prepared by mixing the active ingredient with suitable excipients such as fillers, absorbents, binding agents, disintegrating agents and lubricants and tableting the mixture using conventional methods. Starch, kaolin, lactose, calcium phosphate and magnesium stearate are examples of suitable excipients. Capsules may be prepared by encapsulating the active ingredient in a suitable material, for example gelatin. The active ingredient may be admixed with a suitable orally ingestible diluent, for example liquid paraffin or a vegetable oil such as arachis oil, prior to encapsulation.

Pills or boluses may be prepared by admixing the active ingredient with a suitable orally ingestible matrix, for example a low melting fat or wax such as hydrogenated vegetable oil or paraffin wax. The tablets, capsules, pills and boluses of the invention may be provided with an enteric coating using conventional methods, for example by the provision of formaldehyde-hardened gelatin capsules or by coating tablets, pills or boluses with a suitable enteric coating such as cellulose acetate phthalate.

Drenches, i.e. liquid preparations for oral administration to animals, may be prepared by dispersing the active ingredient in water or dispersing or dissolving the active ingredient in other suitable orally ingestible liquid, for example a suitable polyethylene glycol such as polyethylene glycol 300. Such drenches may contain dispersing agents. Typical dispersing agents for use with aqueous drenches are gum acacia, gum tragacanth, colloidal magnesium aluminum silicate, methylcellulose and hydroxyethylcellulose.

Animal feed compositions may be prepared by intimately mixing the active ingredient with a standard animal feed using conventional methods.

Liquid preparations for injection may comprise sterile aqueous dispersions of the active ingredient or sterile solutions of the active ingredient in a suitable innocuous solvent.

According to a further feature of the invention there is provided a method for the control of helminthiasis in animals, especially domestic animals, which comprises administering, preferably orally, to the animals a therapeutically effective, that is effective but nontoxic, amount of a compound of the invention. A suitable daily dosage of a compound of the invention is generally within the range 1–150 mg./kg., preferably 5–150 mg./kg. and especially 15–100 mg./kg. The method may be used either curatively on a parasitically infected animal or prophylactically.

The compounds of the invention may be prepared by a process which comprises reacting benzotriazole with a carbamoyl halide of the general formula

Z—CON(R)CH$_3$ (II) in which R is as hereinbefore defined and Z is halogen, preferably chlorine or bromine and especially chlorine. The reaction is suitably effected in the presence of an inert organic liquid as the reaction medium, which is preferably a solvent for the reactants. Advantageously the reaction is effected in the presence of a suitable acid-binding agent, for example potassium carbonate or a tertiary amine such as triethylamine, in order to absorb the hydrogen halide produced in the reaction. If desired, benzotriazole may be converted to an alkali metal (for example sodium) derivative thereof prior to the reaction with the carbamoyl halide. The alkali metal derivative may be obtained by reacting benzotriazole with an alkali metal hydride, amide or alkoxide.

The carbomyl halides of the General Formula II may be prepared by reacting a secondary amine of the general formula $NH(R)CH_3$, in which R is as hereinbefore defined, with a carbonyl halide $COZ_2$, preferably phosgene, in accordance with known methods.

The reactions described above and in the examples have been discovered to give mixtures of the 1- and 2-(N,N-dialkylcarbamoyl)benzotriazole compound usually in approximately 80–90 to 20–10 proportions. Often other minor components of the reaction mixture are present in the partially purified end product such as the carbamoyl chloride or acid, the benzotriazole or other reactants of these compounds. The biological results given herein are with such mixtures. These, from an economical viewpoint are most useful and most active ingredients for the anthelmintic compositions of this invention.

If desired the mixtures may be separated by the following chromatographic procedure: (N-methyl-N-n-heptylcarbamoyl)benzotriazole (15 g. 85–15 mixture as obtained from Example 1 hereafter) is separated on a 1.5 in. column over 550 g. of silica gel in 1:1 hexane-ether eluated with a solvent gradient of 10 to 50% ether in hexane. The 1-isomer elutes first (I.R. keto 1705 cm.$^{-1}$; U.V. $E_{254}$ 4.95; $E_{289}$ 4.58) followed by the 2-isomer (I.R. 1745 cm.$^{-1}$; U.V. $E_{284}$ 5.11).

The compounds of the invention may also be prepared by a process which comprises reacting a carbamoyl halide of the general formula

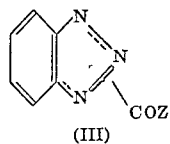

(III)

in which Z is as hereinbefore defined with a secondary amine of the general formula $HN(R)CH_3$. The reaction is suitably effected in the presence of an inert organic liquid as the reaction medium, which is preferably a solvent for the reactants. Advantageously the reaction is effected in the presence of a suitable acid-binding agent, for example potassium carbonate or a tertiary amine such as triethylamine. If desired, the amine $HN(R)CH_3$ may be converted to an alkali metal (for example sodium) derivative thereof prior to the reaction with the carbamoyl halide III.

The carbamoyl halides of General Formula III may be prepared by reacting benzotriazole with a carbonyl halide $COZ_2$, preferably phosgene, in accordance with known methods.

The following non-limitative examples illustrate the invention.

EXAMPLE 1

A solution of 19.8 g. of benzotriazole, 37.5 g. of N-methyl-N-n-heptylcarbamoyl chloride and 35 ml. of dry triethylamine in 150 ml. of dry tetrahydrofuran was refluxed for four hours. The cooled reaction mixture was poured into a mixture of ice and water and the oil which separated was extracted into ether. The ether extract was washed with water, dried over anhydrous magnesium sulphate and evaporated. The residual oil was distilled under reduced pressure to give (N-methyl-N-n-heptylcarbamoyl)benzotriazole, B.P. 172° C./0.4 mm. A satisfactory elemental analysis was obtained.

The N1methyl-N-n-heptylcarbamoyl chloride used in the above preparation was prepared as follows. Hydrogen chloride gas was bubbled through a solution of 30 g. of N-methyl-n-heptylamine in 200 ml. of toluene until absorption of hydrogen chloride ceased. Any traces of water present were then removed azeotropically using a Dean-Stark apparatus. Phosgene was then bubbled into the solution at reflux for five hours. Toluene was distilled off from the reaction mixture and the residue distilled under reduced pressure to give N-methyl-N-n-heptylcarbamoyl chloride, B.P. 116° C./4 mm.

EXAMPLE 2

In a similar way to that described in Example 1, the following compounds were prepared.

(N-methyl-N-n-pentylcarbamoyl)benzotriazole, B.P. 146° C./0.2 mm.

(N-methyl-N-n-hexylcarbamoyl)benzotriazole, B.P. 164° C./0.3 mm.

(N-methyl-N-n-octylcarbamoyl)benzotriazole, B.P. 164–166° C./0.2 mm.

(N-methyl-N-n-nonylcarbamoyl)benzotriazole, B.P. 164° C./0.05 mm.

Satisfactory elemental analysis were obtained for each of these compounds.

Similarly (N-methyl-N-stearylcarbamoyl)benzotriazole; N-isopentyl-N-methylcarbamoyl)benzotriazole and (N-isobutyl-N-methylcarbamoyl)benzotriazole are prepared.

EXAMPLE 3

A dispersion of 4.0% w./v. (N-methyl-N-n-heptylcarbamoyl)benzotriazole in 10% w./v. aqueous gum acacia solution was prepared. This dispersion is suitable for use as a drench for oral administration to sheep.

Similar aqueous dispersions were prepared in which the (N-methyl-N-n-heptylcarbamoyl)benzotriazole was replaced with each of the benzotriazoles listed in Example 2.

EXAMPLE 4

Soft gelatin capsules were prepared, each containing 0.25 g. of (N-methyl-N-n-heptylcarbamoyl)benzotriazole.

Similar capsules were prepared containing 0.25 g. of the benzotriazoles listed in Example 2.

EXAMPLE 5

A single oral dosage of 10 mg./kg. of (N-methyl-N-n-heptylcarbamoyl)benzotriazole of Example 1 administered as a drench (a dispersion in 25 ml. 10% w./v. aqueous gum acacia solution) was found to be effective in the elimination of helminthiasis in a sheep infected with *Haemonchus contortus*. The elimination of the helminth infection was shown by the reduction of faecal worm egg counts to nil within three days after dosing and post-mortem examination of the abomasum, small intestine and large intestine of the sheet seven days after dosing. In a similar way the same test compound was found to be effective at a single oral dosage of 20 mg./kg. against an infection of *Ostertagia circumcincta* in sheep and effective at a single oral dosage of 50 mg./kg. against an infection of *Trichostrongylus colubriformis*.

The following compounds were also found to be effective against the above helminth infections in sheep at the single oral dosage rates given above.

(N-methyl-N-n-pentylcarbamoyl)benzotriazole
(N-methyl-N-n-octylcarbamoyl)benzotriazole
(N-methyl-N-n-nonylcarbamoyl)benzotriazole.

What is claimed is:
1. A compound of the formula:

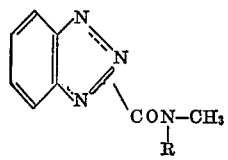

in which R is alkyl of from 5–9 carbon atoms.
2. (N-methyl-N-n-heptylcarbamoyl)benzotriazole.
3. (N-methyl-N-n-pentylcarbamoyl)benzotriazole.
4. 2-(N-methyl-N-n-heptylcarbamoyl)benzotriazole.
5. 1-(N-methyl-N-n-heptylcarbamoyl)benzotriazole.

References Cited
UNITED STATES PATENTS
3,248,398   4/1966   Mühlbauer et al. ___ 260—30.8 B ALTON D. ROLLINS, Primary Examiner U.S. Cl. X.R.
260—544 C; 424—269